United States Patent [19]
Dragone et al.

[11] Patent Number: 5,425,116
[45] Date of Patent: Jun. 13, 1995

[54] TUNABLE OPTICAL WAVEGUIDE GRATING ARRANGEMENT

[75] Inventors: Corrado Dragone, Little Silver; Ivan P. Kaminow, Holmdel, both of N.J.; Mark E. Kuznetsov, Lexington, Mass.

[73] Assignee: AT&T Corp., Murray Hill, N.J.

[21] Appl. No.: 152,511

[22] Filed: Nov. 16, 1993

[51] Int. Cl.$^6$ .............................................. G02B 6/34
[52] U.S. Cl. ........................................ 385/24; 385/44; 385/37
[58] Field of Search ................................ 385/24, 44, 37

[56] References Cited

U.S. PATENT DOCUMENTS

| | | | |
|---|---|---|---|
| 4,252,402 | 2/1981 | Puech et al. | 385/24 X |
| 4,740,050 | 4/1988 | Husain | 385/24 |
| 5,046,807 | 9/1991 | Unitt | 359/113 |
| 5,136,671 | 8/1991 | Dragone | 385/46 |
| 5,212,758 | 4/1992 | Adar et al. | 385/129 |

OTHER PUBLICATIONS

R. E. Collin, *Foundations of Microwave Engineering*, McGraw-Hill, 1966, p. 243 (no month available).

*Primary Examiner*—Frank Gonzalez
*Attorney, Agent, or Firm*—Stuart H. Mayer

[57] ABSTRACT

A tunable waveguide grating includes a plurality of N waveguides which define N optically transmissive pathways. A plurality of (N−1) electrodes are arranged in the pathways such that the kth pathway contains (k-1) electrodes, where $0<k<N$. As a result of this arrangement, an optical signal propagating through the kth pathway will experience a phase shift provided by each of the (k-1) electrodes arranged in that pathway. Consequently, in contrast to prior tunable optical gratings, each electrode may contribute a phase shift to the portions of the signal propagating through several waveguides and hence as the number of waveguides increases no individual electrode is required to produce relatively large phase shifts.

7 Claims, 1 Drawing Sheet

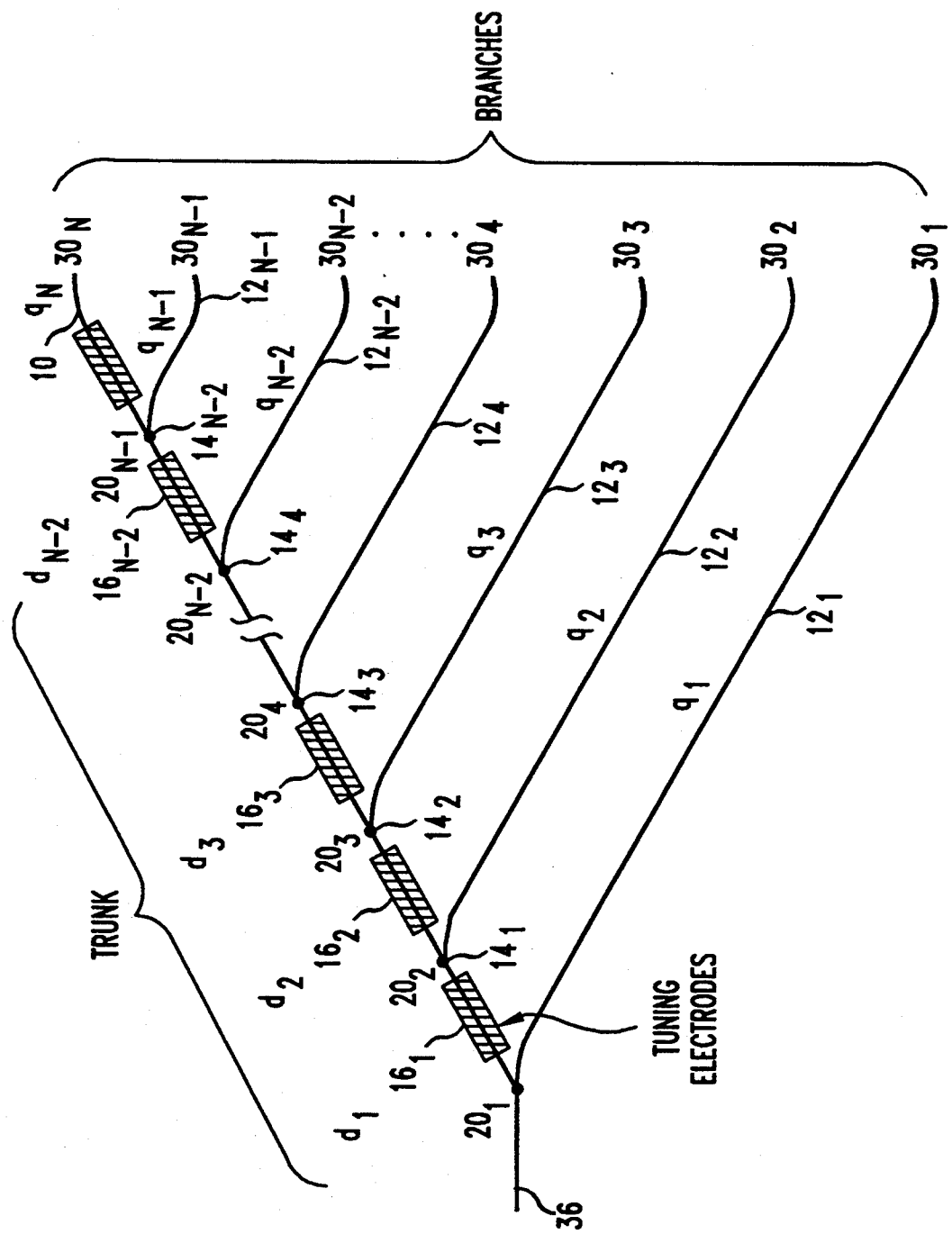

TUNABLE OPTICAL WAVEGUIDE GRATING ARRANGEMENT

CROSS-REFERENCE TO RELATED APPLICATIONS

This application is related to application Ser. No. 19,961 of Bernard Glance and Robert Wilson, entitled "Rapidly Tunable Integrated Optical Filter", filed on Feb. 19, 1993 and now U.S. Pat. No. 5,339,157 issued Aug. 16, 1994.

This application is related to application Ser. No. 19,957 (still pending) of Bernard Glance and Robert Wilson, entitled "Rapidly Tunable Wideband Integrated Optical Filter", filed on Feb. 19, 1993.

This application is related to application Ser. No. 19,951 of Bernard Glance and Robert Wilson, entitled "Rapidly Tunable Wideband Integrated Laser", filed on Feb. 19, 1993 now U.S. Pat. No. 5,373,516 issued Dec. 13, 1994.

This application is related to application Ser. No. 19,952 of Corrado Dragone and Ivan Kaminow, entitled "Rapidly Tunable Integrated Laser", filed on Feb. 19, 1993 now U.S. Pat. No. 5,373,517 issued Dec. 13, 1994.

This application is related to application Ser. No. 08/153,523 (still pending) of Bernard Glance entitled "Fast Tunable Channel Dropping Filter" filed on the same day this application is being filed.

This application is related to application Ser. No. 138,659 (still pending) of Bernard Glance and Robert Wilson entitled "Optical Passband Filter."

This application is related to application Ser. No. 08/152,517 (still pending) of Bernard Glance entitled "Optical Filter Having Integrated Transceivers," filed on the same day as this application is being filed.

This application is related to application Ser. No. 08/135,836 (still pending) of Martin Zirngibl entitled "High-Power, Single-Frequency Tunable Laser," filed on Oct. 13, 1993.

TECHNICAL FIELD

This invention relates to optical communications systems. More particularly, this invention relates to tunable optical waveguide gratings used in optical communications systems.

BACKGROUND

Tunable optical waveguide gratings are employed as dispersive elements in a wide variety of optical devices such as tunable filters, multiplexers and lasers. For example, an interconnection apparatus for optical switching, multiplexing, and demultiplexing is composed of a plurality of closely spaced input waveguides communicating with the input of a star coupler which functions as a splitter. The output of the star coupler communicates with a second star coupler via an optical grating consisting of an array of optical waveguides. Each of the waveguides differ in length with respect to its nearest neighbor by a predetermined fixed amount. The outputs of the second star coupler form the outputs of the switching, multiplexing, and a demultiplexing apparatus. See, for example, U.S. Pat. No. 5,002,350 issued Mar. 26, 1991.

The optical grating located between the two star couplers is essentially composed of an array of curved waveguides of different lengths. The length of each waveguide in the grating differs from the lengths of all the other waveguides in the grating so that, in effect, predetermined and different phase shifts are applied to optical signals propagating into the waveguides of the grating from the star coupler. This phase shift occurs because of the different path lengths over which the signals in the grating must travel to reach the grating output. The output of the waveguides in the grating thus have different phases, which are functions of the lengths of the waveguides.

The phase shifts applied to the optical signal can be altered by providing each waveguide of the optical grating with a suitable electrode controlling the refractive index of the waveguide. For instance, in a semiconductor device, the current applied to the electrode may be used to change the carrier concentration, thus causing a change in the phase of the signal propagating in each waveguide (see, for example, "Guided-Wave Optoelectronics", Ed. by T. Tamir, Springer-Verlag, 1988). An optical waveguide grating having such control electrodes to vary the phase shifts of the signal is referred to as a tunable waveguide grating.

A tunable grating which is composed of a large number of individual waveguides is difficult to implement because it requires a large total electrode area which in turn requires a large total tuning current. Specifically, if N is the number of individual waveguides forming the grating, the total tuning current increases quadratically with increasing N for large N. For example, if the optical path length is to vary be $\delta l$ in the $k=2$ waveguide, the total tuning current required is:

$$I_G = \sum_{k=2}^{N} (k-1) \cdot \alpha \cdot \delta l = \frac{N(N-1)}{2} \cdot \alpha \cdot \delta l \tag{1}$$

where $(k-1)\delta l$ is the path length variation that must be produced in the kth waveguide relative to the preceding waveguide and $\alpha \delta l$ 1 is the current required to produce $\delta l$. The constant $\alpha$ is a function of the material properties of the waveguide and its cross-sectional area, but is independent of electrode length. As seen from the above expression, the required current for large N increases quadratically with N, thus making this technique impractical for tunable gratings having a large number of waveguides. Moreover, the required current is the same whether or not synchronous filter tuning with single-knob current control is employed.

Until now, there has been no convenient way to produce a tunable optical waveguide grating which has a large number of waveguides without requiring a large tuning current.

SUMMARY

In accordance with this invention, a tunable optical waveguide grating has been developed which can be increased in size while maintaining the required tuning current at a practical level. In particular, if N is the number of individual waveguides forming the grating, the total tuning current increases only linearly with increasing N.

In specific terms, one example of the invention comprises a plurality of N waveguides which define N optically transmissive pathways. A plurality of (N-1) electrodes are arranged in the pathways such that the kth pathway contains (k-1) electrodes, where $0<k<N$. As a result of this arrangement, an optical signal propagating through the kth pathway will experience a phase shift provided by each of the (k-1) electrodes arranged in that pathway. Consequently, in contrast to prior tunable optical gratings, each electrode may contribute a phase shift to the portions of the signal propagating through several waveguides and hence as the number of waveguides increases no individual electrode is required to produce relatively large phase shifts.

This is only one example of the invention. The full scope of the invention entitled to an exclusionary right is set forth in the claims at the end of this application.

BRIEF DESCRIPTION OF THE DRAWING

The sole FIG. is a diagram of an example of a tunable optical waveguide grating in accordance with this invention.

DETAILED DESCRIPTION

Referring to FIG. 1, there is illustrated a schematic diagram of an example of the tunable grating of the present invention. The grating is composed of a main waveguide trunk 10 to which are coupled a series of waveguide branches $12_1$, $12_2$, ..., $12_{(N-1)}$. The remote end $30_N$ of the waveguide trunk 10 forms the Nth waveguide of the grating. The waveguide branches $12_1$, $12_2$, ..., $12_{(N-1)}$ have lengths $q_1$, $q_2$, ..., $1_{(n-1)}$, respectively. One end of each of the waveguide branches $12_1$, $12_2$, ..., $12_{(N-1)}$ is connected to the waveguide trunk 10 at one of a respective series of branch points $20_1$, $20_2$, ..., $20_{(N-1)}$. The connection formed at each of the branch points may be accomplished by a waveguide Y-branch coupler or by a directional coupler. The branch points $20_2$, $20_3$, ..., $20_{(N-1)}$ are spaced apart from the preceding branch point along the waveguide trunk 10 at predetermined distances $d_2$, $d_3$, ... $d_{(N-1)}$, respectively. The predetermined distances between branch points are not necessarily all equal and may be chosen in accordance with the requirements of the particular application.

The branch points $20_1$, $20_2$, ..., $20_{(N-1)}$ serve to define segments $14_1$, $14_2$, ..., $14_N$ along the waveguide trunk 10. Control electrodes $16_1$, $16_2$, ... $16_N$ are applied to the waveguide trunk 10 at each of the respective ones of the segments $14_1$, $14_2$, ... $14_N$. In a preferred embodiment of the invention, the control electrodes are all substantially identical. In an alternative embodiment of the invention, the electrodes may be replaced with resistive elements which serve to change the length of the waveguide segments by applying heat to cause an expansion of the waveguides.

An input signal directed to the input of the tunable grating via an input waveguide 36 will undergo dispersion as a result of propagation through the various branches of the grating in a manner to be described below.

If $P_k$ is the power from the input optical signal which propagates through the kth waveguide branch $12_1$, $12_2$, ... $12_{(N-1)}$ (hereinafter referred to as the "kth branch"), the fraction of the total input power which traverses this kth branch is:

$$r_k = P_k / \sum_{i<k} P_i \qquad (2)$$

The total path length $l_k$ from the input $20_1$ of the grating to the output at the remote end $30_k$ of the kth branch $12_1$, $12_2$, ..., $12_{(N-1)}$ (hereinafter referred to as the "kth path through the grating") is:

$$l_k = q_k + \sum_{i<k} d_i \qquad (3)$$

Equation 3 illustrates a significant property resulting from the configuration of the grating. Specifically, the total path length $l_k$ of the kth path through the grating is a function of the lengths of the ith segments of the waveguide trunk 10 for all $i<k$ (i.e., the kth path through the grating includes segments $14_1$, $14_2$, ..., $14_{(k-1)}$ of the waveguide trunk 10). As a result, if the ith electrode produces a phase shift $\delta 1$ in its respective ith segment of the trunk 10, this phase shift will be applied to signals propagating in each of the k paths through the grating for all $k>i$.

If all the electrodes $16_1$, $16_2$, ... $16_N$ are supplied with the same current they will each produce a phase shift $\delta 1$. Since the kth path through the grating includes (k-1) electrodes each producing a phase shift $\delta 1$ in that path, a signal propagating in the kth path will experience a total phase shift of $(k-1)\delta 1$. Accordingly, each of the N paths through the grating will have a variation in path length of $(k-1)\delta 1$ relative to its immediately preceding path. In other words, every path through the grating has a constant phase shift with respect to its nearest neighbor. This phase distribution is exactly that required for a tunable grating and is the same distribution achieved by the prior grating discussed above.

The required current for the tunable grating of the present invention is:

$$I_T = (N-1)\alpha \cdot \delta 1 \qquad (4)$$

Thus, the required current only increases linearly with increasing N and is smaller than $I_G$, the current required for the prior tunable grating (see equation 1), by a factor of N/2. The required current is therefore significantly reduced relative to the prior tunable grating and is thus more practical and economical.

The tunable grating of the invention may be employed in devices such as tunable filters, multiplexers, and lasers for multiplexing in both long haul and local access networks. In addition to providing phase adjustment, the grating may be used to minimize the total size of the adjustment region that is required when trimming the phases of the filter arms.

The optical waveguide grating of the invention can also be used to control device polarization dependence caused by waveguide birefringence which produces in the arms of a grating unequal phases for the two polarizations TM and TE. In silica waveguides formed on a silicon substrate, substantial birefringence is caused by residual strain arising because of the different expansion coefficients of silica and silicon. Thus, in order to reduce strain birefringence, suitable compensating elements are often inserted in the arms of the grating. (see M. Kawachi, "Silica Waveguides on Silicon and Their Application to Integrated-Optic Components", Optical and Quantum Electronics, 22 (1990), pp. 391-416). It may then be advantageous to reduce the total area of the control elements by using the arrangement of the invention.

The invention may also be employed in connection with the problem of providing a broadband filter by means of a waveguide grating of very low order. Such gratings cannot be realized simply by using curved waveguides of approximately the same curvature.

While gratings of opposite curvatures can be used (see U.S. Pat. No. 5,212,758 to Adar et at.), this arrangement is undesirably large in size. However, by employing the present invention, the overall size can be reduced substantially.

Any desired tuning response shape can be achieved by properly choosing the splitting weights $r_k$. For instance, a maximally flat response or an equal ripple response can be produced by changing the weights in accordance with well known rules of filter design (see, for example, R. E. Coilin in "Foundations of Microwave Engineering", McGraw-Hill, 1966, p. 243). Moreover, variable splitting weights may be achieved by replacing the waveguide branches with tunable directional couplers. Additionally, by including suitable active sections for providing gain, the tunable grating of the invention can be used as a tunable laser.

We claim:

1. A tunable optical grating apparatus comprising:
   a first optical waveguide having a first end for receiving optical energy and second end for transmitting optical energy;
   a plurality of second optical waveguides each having a first end coupled to the first optical waveguide at predetermined points to define a plurality of segments of the first optical waveguide formed between adjacent pairs of the second optical waveguides, said second optical waveguides having a second end for transmitting optical energy, and further defining a plurality of optical paths formed between the first end of the first optical waveguide and the second ends of each of the plurality of second optical waveguides, said optical paths being unequal in length and having a predetermined path length difference between them; and
   an electrode coupled to each of the segments of the first optical waveguide, said electrodes producing a phase shift in an optical signal propagating therethrough.

2. The tunable optical grating apparatus of claim 1 further comprising a plurality of electrodes each coupled to one of the segments of the first optical waveguide.

3. The tunable optical grating apparatus of claim 2 in which the first optical waveguide and the plurality of second optical waveguides comprise a plurality of Y-branch couplers for coupling each of the second optical waveguides to the first optical waveguide.

4. The tunable optical grating apparatus of claim 3 in which the first optical waveguide and the plurality of second optical waveguides comprise a plurality of tunable directional couplers for coupling each of the second optical waveguides to the first optical waveguide.

5. The tunable optical grating apparatus of claim 2 further comprising means for supplying a bias current to each of the electrodes.

6. A tunable optical grating apparatus comprising:
   N waveguides defining N optically transmissive pathways, where $N>2$, said pathways being unequal in length and having a predetermined path length difference between them; and
   a plurality of (N-1) electrodes arranged in said pathways such that the kth pathway contains (k-1) electrodes, where $0<k<N$, said electrodes producing a phase shift in an optical signal propagating therethrough.

7. The tunable optical grating apparatus of claim 6 further comprising means for providing a bias current to each of the electrodes.

* * * * *